United States Patent [19]

Fukui et al.

[11] Patent Number: 5,245,030

[45] Date of Patent: Sep. 14, 1993

[54] IR-RAY ABSORPTIVE AMINO COMPOUND AND OPTICAL RECORDING MEDIUM BY USE THEREOF

[75] Inventors: Tetsuro Fukui; Yoshihiro Oguchi, both of Kawasaki; Hiroyuki Sugata, Yamato; Kyo Miura, Yokohama, all of Japan

[73] Assignee: Canon Kabushiki Kaisha, Tokyo, Japan

[21] Appl. No.: 828,567

[22] Filed: Jan. 31, 1992

Related U.S. Application Data

[62] Division of Ser. No. 223,398, Jul. 25, 1988, Pat. No. 5,108,873.

[30] Foreign Application Priority Data

Jul. 28, 1987 [JP] Japan ................... 62-189393

[51] Int. Cl.$^5$ ................ C07D 207/09; C07D 211/26; C07D 223/04
[52] U.S. Cl. .................... 540/596; 540/597; 540/598; 540/602; 540/609; 544/82; 544/86; 546/187; 546/191; 546/194; 546/229; 546/256; 546/264; 546/281; 546/329; 548/517; 548/523; 548/577; 564/271; 564/309; 564/434
[58] Field of Search ........... 564/271, 309, 434; 540/596, 597, 602, 609, 598; 544/82, 86; 546/187, 191, 194, 229, 256, 264, 281, 329; 548/517, 523, 577

[56] References Cited

U.S. PATENT DOCUMENTS

| 3,484,467 | 12/1969 | Susi et al. | 260/440 |
| 3,670,025 | 6/1972 | Susi et al. | 260/576 |
| 4,656,121 | 4/1987 | Sato et al. | 430/495 |
| 4,933,245 | 6/1990 | Akasaki | 430/59 |
| 5,024,917 | 6/1991 | Mihara et al. | 430/271 |

FOREIGN PATENT DOCUMENTS

| 3503995 | 8/1985 | Fed. Rep. of Germany . |
| 3537539 | 4/1986 | Fed. Rep. of Germany . |
| 62-50187 | 3/1987 | Japan . |

Primary Examiner—Richard L. Raymond
Attorney, Agent, or Firm—Fitzpatrick, Cella, Harper & Scinto

[57] ABSTRACT

An IR-ray absorptive compound represented by the formula (1) or (2):

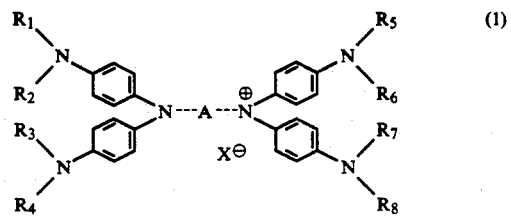

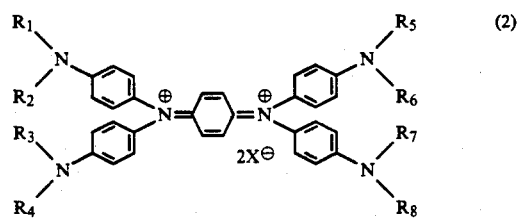

and an optical recording medium having a substrate and an organic dye thin film, comprising the formulae (1) and/or (2).

3 Claims, No Drawings

IR-RAY ABSORPTIVE AMINO COMPOUND AND OPTICAL RECORDING MEDIUM BY USE THEREOF

This application is a division of application Ser. No. 223,398 filed Jul. 25, 1988, now U.S. Pat. No. 5,108,873.

BACKGROUND OF THE INVENTION

1. Field of the Invention

This invention relates to an IR-ray absorptive compound and an optical recording medium by utilizing the same, particularly to an IR-ray absorptive compound and an optical recording medium which can improve durability in repeated reproduction and light resistance in optical disc or optical card.

2. Related Background Art

Generally speaking, an optical recording medium, for example, an optical disc or optical card, can record information at high density by forming optically detectable small pits of, for example, 1 μm on a recording layer provided on a substrate having a spiral, circular or linear groove thereon.

By scanning of a laser beam converged on the surface of the recording layer, the recording layer absorbs the laser energy to form optical detectable pits, whereby information is written. For example, according to the heat mode recording system, the recording layer absorbs heat energy and can form a concave small pit through evaporation or melting at that site. Here, by use of an organic dye thin film as the recording layer with high reflectance, the optical contrast of the recording pit can be set at a high level. For example, when a polymethine type dye, azulene type dye or pyrilium type dye, etc. with great light absorption relative to a laser beam is used for an organic dye thin film, a light absorptive reflective film exhibiting metallic luster (reflectance 10 to 50%) can be obtained, whereby an optical recording medium capable of laser recording and reflective reading can be obtained. Particularly, when a semiconductor laser with an oscillation wavelength of 700 to 800 nm is used as the laser light source, there is the advantage that the device can be made smaller and lower in cost.

However, organic dye thin films had the problem that recording and reproduction characteristics and storage stability may be lowered, because they generally were changed by heat and light, etc.

To cope with such a problem, U.S. Pat. No. 4,656,121 has already proposed an optical recording medium having an aminium salt or diimonium salt of a triarylamine type compound incorporated in the recording layer containing a polymethine type dye.

SUMMARY OF THE INVENTION

An object of the present invention is to provide an IR-ray absorptive compound which is improved in light resistance and repeated production durability and yet better in solvent solubility as compared with those of the prior art and an optical recording medium having light resistance and repeated reproduction durability with good productivity by use thereof.

More specifically, the IR-ray absorptive compound of the present invention is represented by the following formula (1) or (2):

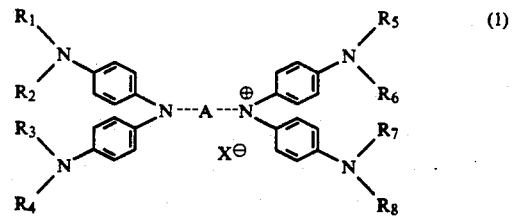

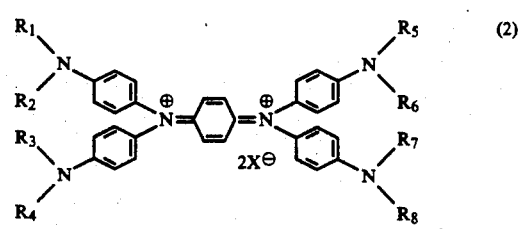

(wherein A represents

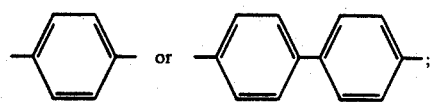

$X^\ominus$ represents an anion; $R_1$ through $R_8$ are each a substituent having 1 to 8 carbon atoms, at least one combination of $R_1$ and $R_2$, $R_3$ and $R_4$, $R_5$ and $R_6$, and $R_7$ and $R_8$ together with N forming a substituted or unsubstituted pyrrolidine ring, a substituted or unsubstituted piperidine ring, a substituted or unsubstituted morpholine ring, a substituted or unsubstituted tetrahydropyridine ring or a substituted or unsubstituted cyclohexylamine ring).

Also, the optical recording medium of the present invention is an optical recording medium having a substrate and an organic dye thin film, comprising a compound of the formula (1) and/or (2) in said organic dye thin film:

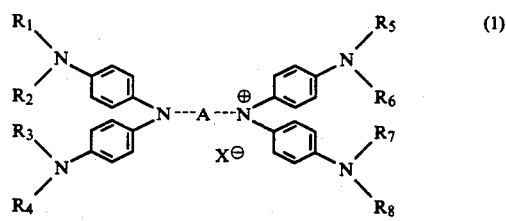

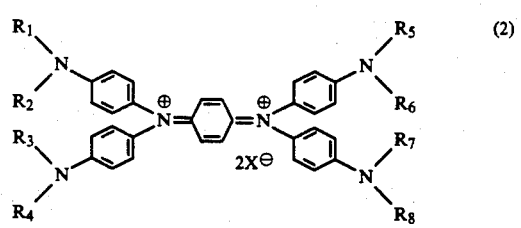

(wherein A represents

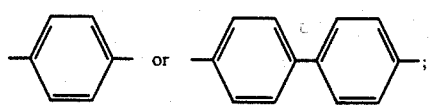

$X^\ominus$ represents an anion; $R_1$ through $R_8$ are each a substituent having 1 to 8 carbon atoms, at least one combination of $R_1$ and $R_2$, $R_3$ and $R_4$, $R_5$ and $R_6$, and $R_7$ and $R_8$ together with N forming a substituted or unsubstituted pyrrolidine ring, a substituted or unsubstituted piperidine ring, a substituted or unsubstituted morpholine ring, a substituted or unsubstituted tetrahydropyridine ring or a substituted or unsubstituted cyclohexylamine ring).

DETAILED DESCRIPTION OF THE INVENTION

The present invention is described below in more detail.

The IR-ray absorptive compound of the present invention is represented by the following formula (1) or (2):

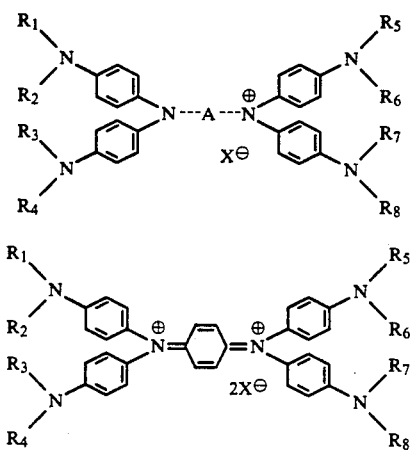

(wherein A represents

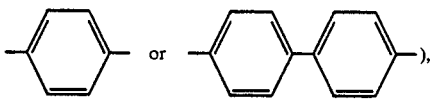

and the aromatic ring at the center may be substituted with a lower alkyl group or a halogen atom.

$X^\ominus$ represents an anion such as chloride, bromide, iodide, perchlorate, nitrate, benzenesulfonate, p-toluenesulfonate, methylsulfate, ethylsulfate, propylsulfate, tetrafluoroborate, tetraphenylborate, hexafluorophosphate, benzenesulfonate, acetate, trifluoroacetate, propionacetate, benzoate, oxalate, succinate, malonate, oleate, stearate, citrate, monohydrogen diphosphate, dihydrogen monophosphate, pentachlorostannate, chlorosulfonate, fluorosulfonate, trifluoromethansulfonate, hexafluoroarsenate, hexafluoroantimonate, molybdenate, tungustate, titanate, zirconate ions, etc.

The substituents of $R_1$ through $R_8$ are straight or branched alkyl groups, which may either the same or different, but at least one combination of $R_1$ and $R_2$, $R_3$ and $R_4$, $R_5$ and $R_6$, and $R_7$ and $R_8$ must form a pyrrolidine ring, piperidine ring, morpholine ring, tetrahydropyridine ring or cyclohexylamine ring.

The compound of the present invention can be produced by utilizing the methods disclosed in U.S. Pat. Nos. 3,251,881, 3,575,871, 3,484,467 and Japanese Patent Laid-open Application No. 61-69991. For example, it can be produced according to the following process.

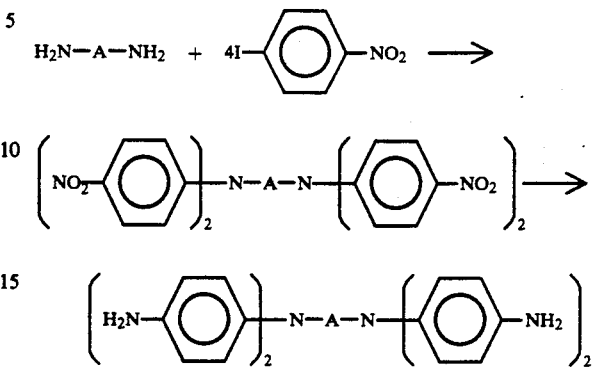

The amino derivative obtained by the above Ulman reaction and reduction reaction can be selectively alkylated by selective alkylation, followed by oxidation reaction to obtain the final product.

In the alkylation reaction, an alkylating agent suitable for obtaining a pyrrolidine ring, piperidine ring, morpholine ring, tetrahydropyridine ring, etc. may be used. When $R_1$ to $R_8$ are made asymmetric, the alkylation is required to be conducted in multiple stages, and $R_1$ to $R_8$ may be preferably the same in cost.

For example, a pyrrolidine ring, can be formed by alkylation with 1,4-dibromobutane, 1,4-dichlorobutane, 1,4-diiodobutane, etc., and for a piperidine ring, 1,5-dibromo-pentane, 1,5-dichloropentane, 1,5-diiodopentane, etc. are employed. For a morpholine ring, after effecting first hydroxyethylation with 2-bromoethanol, a morpholine ring can be formed by dehydration by acid treatment, and a tetrahydropyridine ring can be cyclized with acid treatment after methacrylation with methacryl bromide, etc. A cyclohexylamine ring may be cyclized with 1,6-dibromohexane, etc.

Particularly, cyclization of an amino group can proceed more rapidly as compared to alkylation to give good yield, also and has advantages in production as compared to the propyl derivative or butyl derivative of the prior art.

Next, specific examples of the compounds used in the formulae (1) and (2) are shown. For simplification, the compound represented by the formula (1) is represented by $A, X, (R_1R_2)(R_3R_4)(R_5R_6)(R_7R_8)$ and the compound represented by the formula (2) by $X, (R_1R_2)(R_3R_4)(R_5R_6)(R_7R_8)$. For example, when in the formula (1), A is

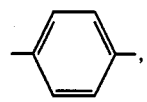

$X^\ominus$ is $ClO_4^\ominus$ and $R_1$ through $R_8$ form 2-methylpyrrolidine rings, the compound is written as:

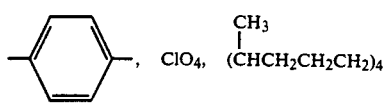

In the formula (2), when $X^\ominus$ is $AsF_6^\ominus$, $R_1$ and $R_2$ form a piperidine ring, and $R_3$ through $R_8$ are n-butyl groups, the compound is written as:

$AsF_6(C_4H_9C_4H_9)_3(CH_2CH_2CH_2CH_2CH_2)$

Compound No.

1-1
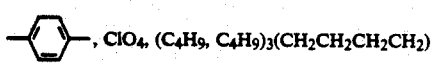, $ClO_4$, $(C_4H_9, C_4H_9)_3(CH_2CH_2CH_2CH_2)$ 1-2
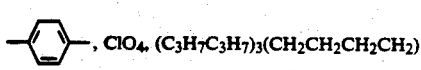, $ClO_4$, $(C_3H_7C_3H_7)_3(CH_2CH_2CH_2CH_2)$ 1-3
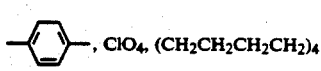, $ClO_4$, $(CH_2CH_2CH_2CH_2)_4$ 1-4
, $ClO_4$, $(C_4H_9, C_4H_9)_3(CH_2CH_2CH_2CH_2CH_2)$ 1-5
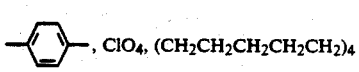, $ClO_4$, $(CH_2CH_2CH_2CH_2CH_2)_4$ 1-6
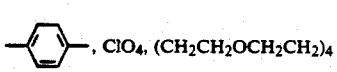, $ClO_4$, $(CH_2CH_2OCH_2CH_2)_4$ 1-7
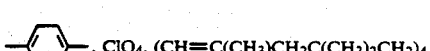, $ClO_4$, $(CH=C(CH_3)CH_2C(CH_3)_2CH_2)_4$ 1-8
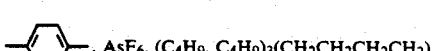, $AsF_6$, $(C_4H_9, C_4H_9)_3(CH_2CH_2CH_2CH_2)$ 1-9
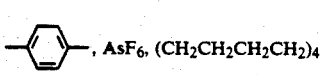, $AsF_6$, $(CH_2CH_2CH_2CH_2)_4$ 1-10
, $AsF_6$, $(CH_2CH_2CH_2CH_2CH_2)_4$ 1-11
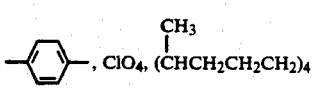, $ClO_4$, $(\overset{CH_3}{\overset{|}{C}H}CH_2CH_2CH_2)_4$ 1-12
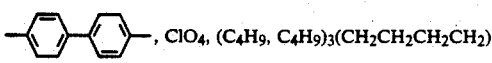, $ClO_4$, $(C_4H_9, C_4H_9)_3(CH_2CH_2CH_2CH_2CH_2)$ 1-13
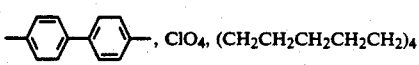, $ClO_4$, $(CH_2CH_2CH_2CH_2CH_2)_4$ 1-14
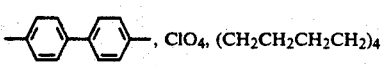, $ClO_4$, $(CH_2CH_2CH_2CH_2)_4$ 1-15
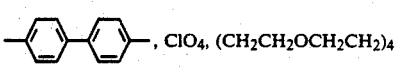, $ClO_4$, $(CH_2CH_2OCH_2CH_2)_4$ 1-16
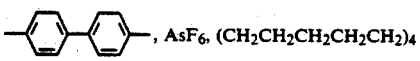, $AsF_6$, $(CH_2CH_2CH_2CH_2CH_2)_4$ 1-17
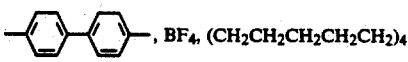, $BF_4$, $(CH_2CH_2CH_2CH_2CH_2)_4$ 1-18
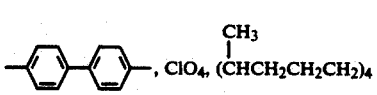, $ClO_4$, $(\overset{CH_3}{\overset{|}{C}H}CH_2CH_2CH_2)_4$ 1-19
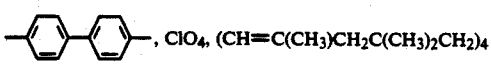, $ClO_4$, $(CH=C(CH_3)CH_2C(CH_3)_2CH_2)_4$ 1-20
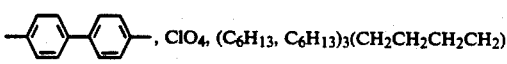, $ClO_4$, $(C_6H_{13}, C_6H_{13})_3(CH_2CH_2CH_2CH_2)$ 1-21
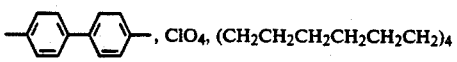, $ClO_4$, $(CH_2CH_2CH_2CH_2CH_2CH_2)_4$ 2-1 $ClO_4$, $(C_4H_9, C_4H_9)_3(CH_2CH_2CH_2CH_2)$ 2-2 $ClO_4$, $(CH_2CH_2CH_2CH_2)_4$ 2-3 $ClO_4$, $(C_5H_{11}, C_5-H_{11})_3(CH_2CH_2CH_2CH_2)$ 2-4 $ClO_4$, $(C_4H_9, C_4H_9)_3(CH_2CH_2CH_2CH_2CH_2)$ 2-5 $ClO_4$, $(CH_2CH_2CH_2CH_2CH_2)_4$ 2-6 $ClO_4$, $(CH_2CH_2OCH_2CH_2)_4$ 2-7 $ClO_4$, $(\overset{CH_3}{\overset{|}{C}H}CH_2CH_2CH_2)_4$ 2-8 $ClO_4$, $(CH=C(CH_3)CH_2C(CH_3)_2CH_2)_4$ 2-9 $BF_4$, $(CH_2CH_2CH_2CH_2CH_2)_4$ 2-10 $BF_4$, $(C_4H_9, C_4H_9)_3(CH_2CH_2CH_2CH_2CH_2)$ 2-11 $AsF_6$, $(CH_2CH_2CH_2CH_2)_4$ 2-12 $AsF_6$, $(CH_2CH_2CH_2CH_2CH_2)_4$ 2-13 $AsF_6$, $(C_4H_9, C_4H_9)_3(CH_2CH_2CH_2CH_2)$ 2-14 $SbF_6$, $(CH_2CH_2CH_2CH_2)_4$ Such aminium salt compounds and diimonium compounds have maximum asbsorption wavelengths at 900 nm or longer, and also great absorption peaks with absorption coefficients being about some 10,000 to 100,000 and some 10,000.

Such compounds can be used for heat insulating films, sunglasses, etc, as well as being used as materials for optical recording medium.

As the near infrared-ray absorptive dye to be used with these compounds in the recording medium, there may be included dyes generally known in the art, such as cyanine type dyes, melocyanine type dyes, croconium type dyes, squarilium type dyes, azulenium type dyes, polymethine type dyes, naphthoquinone type dyes, pyrilium type dyes, phthalocyanine type dyes, etc. Particularly, polymethine type dyes having polymethine chains or azulenium type dyes are preferable in view of compatibility or interaction with the above aminium salts or diimonium salts.

The amount of the aminium salt compound of the above formula (1) or the diimonium compound of the formula (2) added relative to these dyes should be suitably 1 to 60% by weight, preferably 5 to 40% by weight, more preferably 10 to 30% by weight based on the total solids in the recording layer.

Other than these compounds, a binder may be also incorporated in the recording layer. Examples of binder may include cellulose esters such as nitrocellulose, cellulose phosphate, cellulose sulfate, cellulose acetate, cellulose propionate, cellulose lactate, cellulose myristate, cellulose palmitate, cellulose acetate.propionate, cellulose acetate butyrate, etc.; cellulose ethers such as methyl cellulose, ethyl cellulose, propyl cellulose, butyl cellulose, etc.; vinyl resins such as polystyrene, polyvinyl chloride, polyvinyl butyral, polyvinyl acetal, polyvinyl alcohol, polyvinyl pyrrolidone, etc.; copolymer resins such as styrene-butadiene copolymer, styrene-acrylonitrile copolymer, styrene-butadiene-acrylonitrile copolymer, vinyl chloride-vinyl acetate copolymer; acrylic resins such as polymethyl methacrylate, polyacrylic acid, polymethacrylic acid, polymethylacrylate, polybutylacrylate, polyacrylamide, polyacrylonitrile, etc.; polyesters such as polyethylene terephthalate, etc.; polyarylate resins such as poly(4,4'-isopropylidenediphenylene-co-1,4-cyclohexylenedimethylenecarbonate), poly(ethylenedioxy-3,3'-phenylenethiocarbonate), poly(4,4'-isopropylidenediphenylenecarbonate), poly(4,4'-isopropylidenediphenylenecarbonate), poly(4,4'-sec-butylidenediphenylenecarbonate), poly(4,4'-isopropylidenediphenylenecarbonate-block-oxyethylene), etc; or polyamides; polyimides; epoxy resins; phenol resins; polyolefins such as polyethylene, polypropylene, chlorinated polyethylene, etc.

Also, in the recording layer, surfactants, antistatic agents, stabilizers, dispersing agents, flame retardants, lubricants, plasticizers, etc. may be also incorporated.

Also, between the recording layer and the substrate, a subbing layer may be provided and on the recording layer, a protective layer may be provided.

The subbing layer is provided for imparting solvent resistance, improvement of reflectance or improvement of repeated reproduction, and the protective layer is used for protection against flaws, dust, contamination and for environmental stability of the recording layer. The materials used for these materials may include primarily inorganic compounds, metals or organic polymeric compounds. Examples of inorganic compounds may include $SiO_2$, $MgF_2$, SiO, $TiO_2$, ZnO, Tin, SiN, etc.; examples of metals include Zn, Cu, Ni, Al, Cr, Ge, Se, Cd, etc.; and examples of organic polymeric compounds include ionomer resins, polyamides type resins, vinyl resins, natural polymers, epoxy resins, silane coupling agents, etc.

As the substrate, plastics such as polyester, polycarbonate, acrylic resin, polyolefin resin, phenol resin, epoxy resin, polyamide, etc., glasses or metals can be used.

The organic solvent which can be used during coating may differ depending on whether the coating liquid is made a dispersion or a solution, but may generally include alcohols such as methanol, ethanol, isopropanol, diacetone alcohol, etc.; ketones such as acetone, methyl ethyl ketone, cyclohexanone, etc.; amides such as N,N-dimethylformamide, N,N-dimethylacetamide, etc.; sulfoxides such as dimethylsulfoxide, etc.; ethers such as tetrahydrofuran, dioxane, ethylene glycol monomethyl ether, etc.; esters such as methyl acetate, ethyl acetate, butyl acetate, etc.; aliphatic halogenated hydrocarbons such as chloroform, methylene chloride, dichloroethylene, carbon tetrachloride, trichloroethylene, etc.; aromatics such as benzene, toluene, xylene, monochlorobenzene, dichlorobenzene; or aliphatic hydrocarbons such as n-hexane, cyclohexanoligroin, etc.

Coating can be preformed by use of dip coating, spray coating, spinner coating, bead coating, wire bar coating, blade coating, roller coating, curtain coating, etc.

The film thickness of the recording layer formed by use of such solvent may be suitably 50 Å to 100 $\mu$m, preferably 200 Å to 1 $\mu$m.

As described above, the compounds represented by the formulae (1) and (2) have great absorption regions in the IR-region, can be synthesized simply and when used for an optical recording medium, can provide an optical recording medium improved in repeated reproduction durability and light resistance stability.

The present invention is described below in more detail by referring to Examples.

SYNTHESIS EXAMPLE

A mixture of 0.1 mol of p-phenylenediamine, 0.6 mol of p-nitroiodobenzene, 0.25 mol of anhydrous potassium carbonate and 2 parts (by weight) of copper powder was refluxed under stirring in 150 parts of dimethylformamide for 4 days. After the reaction, the reaction mixture was filtered and the filtered product was washed well with dimethylformamide, water and acetone, followed by drying, to obtain 30 parts of reddish brown tetrakis (p-nitropheyl)-p-phenylenedimine.

The compound obtained above (25 parts) together with 1 part of dimethylformamide palladium-carbon hydrogenation catalyst were added into an autoclave, hydrogen gas was applied to a pressure of 5.0 kg/cm$^2$ and stirring was continued at 90° C. to 100° C. until hydrogen absorption ceased.

After the reaction, the reaction mixture was filtered, the filtered product was washed with dimethylformamide and then the filtrate was poured into 350 parts of ice-water. After stirring for a while, the precipitates were collected by filtration. Recrystallization from ethanol-dimethylformamide solvent mixture gave 14 parts of tetrakis (p-aminophenyl)-p-phenylenediamine. The purity by high performance liquid chromatography was found to be 98.7%.

By NMR (d$_6$—DMSO) analysis, asbsorption of amino group corresponding to 8H at $\delta$3.37 ppm, and absorption of aromatic ring corresponding to 20H of broad doublet at $\delta$6.38 to 6.50 ppm were measured.

SYNTHESIS OF 1-3

The above amino derivative (6.0 parts) was dissolved in 30 parts of dimethylformamide. 8.0 parts of anhydrous sodium hydrogen carbonate and 12.3 parts of 1,4-dibromobutane were added to the solution and the mixture was stirred under heating at 90° C. to 110° C. After reaction for 10 hours, the reaction mixture was poured into 100 parts of ice-water and the precipitates were collected by filtration. After drying, the product was purified by silica gel column.

Amount obtained was 8.3 parts (yield: 95.0%). By IR-absorption analysis, disappearance of the absorption by NH stretching vibration of amino group was confirmed.

One part of the cyclized compound was dispersed in 30 parts of acetone and an equimolar amount of silver perchlorate was added to the dispersion under stirring. After reaction at room temperature for 30 hours, the precipitated silver was separated by filtration and washed well with acetone. After evaporation of the solvent, the residue was washed with water and dried. Amount obtained: 0.85 part.

The thus synthesized 1-3 was found to be a compound having a great absorption region in the IR-region with the maximum absorption wavelength of 1019 nm and absorption coefficient of 88,000.

SYNTHESIS OF 1-5

The same reaction as in the synthesis of 1-3 was carried out except for using 1,5-dibromopentane in place of 1,4-dibromobutane.

The maximum absorption wavelength was 1030 nm.

The examples as described illustrate an anion which is perchlorate, but when other anions are used, the desired compounds can be easily obtained by use of silver salts corresponding thereto. For example, silver salts such as $AgSbF_6$, $AgBF_4$, $AgSO_4$, $AgNO_3$, $AgAsF_6$, $AgSO_3C_6H_4CH_3$, $AgSO_3CF_3$, etc. can be used. Otherwise, they also can be obtained by electrolytic oxidation.

SYNTHESIS EXAMPLE 2

The same reaction as in Synthesis example 1 was carried out except for changing p-phenylenediamine used in Synthesis example 1 to benzidine to obtain 12 parts of orange tetrakis (p-aminophenyl)benzidine.

SYNTHESIS OF 1-12

The amino derivative obtained in Synthesis example 2 (2 parts) was reacted for 16 hours with 40 parts of dimethylformamide, 0.33 part of anhydrous sodium hydrogen carbonate and 0.78 part of 1,4-dibromobutane at 90° C. to 110° C. The reaction mixture was poured into 300 parts of ice-water and, after stirring, the precipitates were filtered, and washed with water and ethanol. After drying, the product was separated from the starting materials. Amount obtained: 1.4 parts.

The pyrrolidine derivative obtained above (1 part) was reacted with 20 parts of dimethylformamide, 2.2 parts of butyl iodide and 1 part of anhydrous sodium carbonate at 120° C. for 30 hours. After the reaction, the mixture was poured into 100 parts of ice-water and the product recovered by filtration. By purification with silica gel column, 1.1 parts of the desired product were obtained. By IR-absorption analysis, disappearance of the absorption by the NH stretching vibration of amino group was confirmed.

The above compound (0.5 part) was dispersed in 20 parts of acetone and silver perchlorate was added thereto to carry out the reaction under room temperature for 30 hours. After the reaction, silver was filtered off and the solvent was evaporated from the filtrate to give 0.3 part of the desired product (1-12). The maximum absorption wavelength was 1050 nm.

SYNTHESIS OF 2—2

While 1.0 part of the pyrrolidine derivative obtained in the course of synthesis of 1-3 was dispersed with stirring into 40 pars of acetone, 2-fold mols of silver perchlorate were added an the mixture was stirred for 1 hour. After the precipitated silver salt was separated by filtration and washed well with acetone. After evaporation of acetone from the filtrate, the residue was washed with water and dried under reduced pressure. Amount obtained: 0.45 part. The product was an IR-ray absorptive compound having the maximum peak at 1040 nm.

Next, Examples utilizing the IR-ray absorptive compounds represented by the formulae (1) and (2) are to be described.

EXAMPLE 1

On a PMMA substrate with a diameter of 130 mm and a thickness of 1.2 mm was provided a pregroove of 50μ, and a solution containing an organic dye of a polymethine dye (IR-820, produced by Nippon Kayaku) and the above IR-ray absorptive compound No. 1-5 dissolved at a weight ratio of 90:10 in 1,2-dichloroethane was applied by spin coating to provide a recording layer of 800 Å. With a spacer of 0.3 mm sandwiched between the inner circumference side and the outer circumference side of the medium thus obtained, another PMMA substrate was plastered with a UV-ray adhesive to obtain an optical recording medium of an air-sandwich structure.

With this medium rotated at 1800 rpm, writing of a spot diameter of 1.5 μm φ was effected from the substrate side with a recording power of 6 mW and a recording frequency of 2 MHz by use of a semiconductor laser of 830 nm. Next, reproduction was effected with a reading power of 0.9 mW and the C/N ratio was measured by spectral analysis. Subsequently, the C/N ratio after performing reading for 100,000 times (repeated reproduction) was measured.

Further, a light-resistant stability test was performed by irradiating a xenon lamp light of 1 KW/m² on the recording medium prepared under the above conditions for 100 hours, and the reflectance and the C/N ratio were measured. The results are shown in Table 1.

EXAMPLE 2

On the same substrate as in Example 1, a recording layer was provided with a solution of 1-guaiazulenyl-5-(6'-t-butyl-azulenyl)-2,4-pentadienyl perchlorate and the above IR-ray absorptive compound No. 1-11 at a weight ratio of 90:10.

The same test as in Example 1 was conducted with the thus obtained optical recording medium. The results are shown in Table 1.

TABLE 1

| Initial stage | | After repeated reproduction | After light resistance test | |
|---|---|---|---|---|
| Reflectance (%) | C/N (dB) | C/N (dB) | Reflectance (%) | C/N (dB) |
| 25.0 | 57 | 55 | 22.7 | 54 |
| 27.6 | 54 | 54 | 23.1 | 51 |

EXAMPLES 3–7

Optical recording media comprising the compositions shown in Table 2 were prepared in the same manner as in Example 1 and the same test as in Example 1 was conducted. The results are shown in Table 3.

TABLE 2

| Example No. | Organic dye | IR-absorptive compound No. | Weight ratio |
|---|---|---|---|
| 3 | 1,5-Diguaiazulenyl-2,4-pentadienyl perchlorate | 2-5 | 85:15 |
| 4 | (p-Dimethylaminophenyl)-(p-ethoxyphenyl)methylene-1-cyclopente-2-nyl-3- | 1-18 | 90:10 |

TABLE 2-continued

| Example No. | Organic dye | IR-absorptive compound No. | Weight ratio |
|---|---|---|---|
| | (p-dimethylaminophenyl)-(p-ethoxyphenyl)-carbonium perchlorate | | |
| 5 | 1,5-Bis(diethylaminophenyl)-1,5-diphenyl-2,4-pentadienyl perchlorate | 2-12 | 90:10 |
| 6 | 1,1,5-Triguaiazulenyl-2,4-pentadienyl perchlorate | 1-8 | 80:20 |
| 7 | NK-1414 produced by Nippon Kanko Shikiso | 2-10 | 70:30 |

COMPARATIVE EXAMPLES 1-3

Optical recording media were prepared and evaluated in the same manner as in Examples 2 and 5 except for excluding the IR-ray absorptive compounds used in Examples 1, 2 and 5. The results are shown in Table 3.

COMPARATIVE EXAMPLE 4

An optical recording medium was prepared and evaluated except for changing the IR-ray absorptive compound used in Example 1 to perchloric acid salt of aminium of N,N,N',N'-tetrakis(p-di-n-butylaminophenyl)-p-phenylenediamine. The results are shown in Table 3.

COMPARATIVE EXAMPLE 5

An optical recording medium was prepared and evaluated except for changing the IR-ray absorptive compound used in Example 2 to perchloric acid salt of aminium of N,N,N',N'-tetrakis(p-di-n-butylaminophenyl)-p-phenylenediamine.

COMPARATIVE EXAMPLE 6

An optical recording medium was prepared and evaluated except for changing the IR-ray absorptive compound used in Example 3 to perchloric acid salt of aminium of N,N,N',N'-tetrakis(p-dipropylaminophenyl)-p-phenylenediamine.
The results are shown in Table 3.

TABLE 3

| | Initial stage | | After repeated reproduction C/N (dB) | After light resistance test | |
|---|---|---|---|---|---|
| | Reflectance (%) | C/N (dB) | | Reflectance (%) | C/N (dB) |
| Example No. | | | | | |
| 3 | 27.2 | 52 | 52 | 21.9 | 50 |
| 4 | 25.0 | 53 | 53 | 19.9 | 48 |
| 5 | 25.6 | 55 | 52 | 20.7 | 50 |
| 6 | 29.2 | 54 | 53 | 21.5 | 50 |
| 7 | 32.2 | 53 | 50 | 18.8 | 47 |
| Comparative Example | | | | | |
| 1 | 19.8 | 50 | 46 | 13.1 | 32 |
| 2 | 28.2 | 54 | 51 | 15.1 | 33 |
| 3 | 25.8 | 54 | 48 | 13.8 | 30 |
| 4 | 25.0 | 57 | 55 | 22.5 | 53 |
| 5 | 26.5 | 52 | 50 | 19.8 | 45 |
| 6 | 25.0 | 50 | 47 | 18.3 | 44 |

EXAMPLES 8-11

On a polycarbonate (hereinafter abbreviated as "PC") substrate with a thickness of 0.4 mm of a wallet size was provided a pregroove by the hot press method, and a solution of the organic dye and the IR-ray absorptive compound shown in Table 4 mixed in diacetone alcohol was applied by the bar coating method, followed by drying to obtain a recording layer of 850 Å. Next, using the hot roll method, a wallet size layer of 0.3 mm thick PC substrate, coated with a dry film of ethylenevinyl acetate copolymer adhesive, was laminated to the recording layer.

The optical recording medium thus prepared was mounted on a stage driven in the X-Y direction, and information was written on the organic thin film recording layer from the 0.4 mm PC substrate side in the Y-axis direction with a spot size of 3.0 $\mu m\phi$, a recording power of 4.0 mW and a recording pulse of 80 usec by use of a semiconductor laser with an oscillation wavelength of 830 nm, and reproduced with a reading power of 0.4 mW, and its contrast ratio (A-B/A:A→signal strength at unrecorded portion, B→signal strength at recorded portion) was measured.

Further, the same recording medium prepared under the above conditions was subjected to a light-resistant stability test under the same conditions as in Example 1, and thereafter the reflectance and the contrast ratio were measured. The results are shown in Table 5.

TABLE 4

| Example No. | Organic dye | IR-absorptive compound No. | Weight ratio |
|---|---|---|---|
| 8 | IR-820 (produced by Nippon Kayaku) | 2-5 | 70:30 |
| 9 | (p-Dimethylaminophenyl)-(p-ethoxyphenyl)-methylene-1-cyclopente-2-nyl-3-(p-dimethylaminophenyl)-(p-ethoxyphenyl)-carbonium perchlorate | 1-18 | 85:15 |
| 10 | 1,5-Bis(dipropylaminophenyl)-1,5-diphenyl-2,4-pentadienyl perchlorate | 1-6 | 80:20 |
| 11 | 1-Guaiazulenyl-5,5-bis(diethylaminophenyl)-2,4-pentadienyl perchlorate | 2-9 | 80:20 |

COMPARATIVE EXAMPLES 5-6

Except for excluding the IR-ray absorptive compounds in Examples 8 and 10, optical recording media were prepared and evaluated in the same manner as in Examples 8 and 10. The results are shown in Table 5.

COMPARATIVE EXAMPLE 7

An optical recording medium was prepared and evaluated in the same manner as in Example 9 except for changing the IR-ray absorptive compound to perchloric acid salt of diimonium of N,N,N'N'-tetrakis(p-di-n-butylaminophenyl)-p-phenylenediamine. The results are shown in Table 5.

TABLE 5

| | Initial stage | | After light resistance test | |
|---|---|---|---|---|
| | Reflectance (%) | Contrast ratio | Reflectance (%) | Contrast ratio |
| Example No. | | | | |
| 8 | 14.7 | 0.81 | 12.7 | 0.76 |
| 9 | 15.3 | 0.83 | 13.0 | 0.77 |
| 10 | 15.0 | 0.80 | 12.9 | 0.75 |
| 11 | 15.3 | 0.82 | 13.1 | 0.76 |
| Comparative Example | | | | |
| 5 | 15.0 | 0.79 | 11.5 | 0.68 |

TABLE 5-continued

| | Initial stage | | After light resistance test | |
|---|---|---|---|---|
| | Reflectance (%) | Contrast ratio | Reflectance (%) | Contrast ratio |
| 6 | 15.1 | 0.80 | 9.8 | 0.61 |
| 7 | 15.2 | 0.82 | 12.8 | 0.75 |

COMPARATIVE EXAMPLES 8-9

Optical recording media were prepared and evaluated in the same manner as in Example 8 except for changing the IR-ray absorptive compound to hexafluoroarsenic acid salt of aminium of N,N,N',N'-tetrakis(p-di-n-butylaminophenyl)-p-phenylenediamine and hexafluoroarsenic acid salt of diimonium of N,N,N',N'-tetrakis(p-di-n-butylaminophenyl)-p-phenylenediamine. The results are shown in Table 6.

TABLE 6

| | Initial stage | | After light resistance test | |
|---|---|---|---|---|
| Comparative Example | Reflectance (%) | Contrast ratio | Reflectance (%) | Contrast ratio |
| 8 | 15.3 | 0.80 | 12.5 | 0.71 |
| 9 | 15.0 | 0.80 | 12.1 | 0.70 |

What is claimed is:

1. An IR-ray absorptive compound represented by the formula (1) or (2):

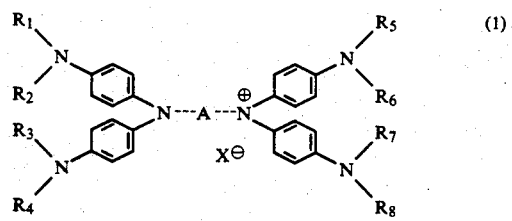

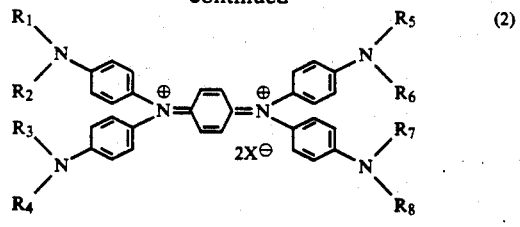

wherein A represents

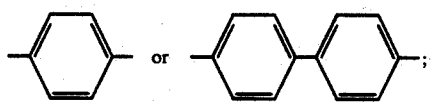

$X^{\ominus}$ represents an anion; $R_1$ through $R_8$ are each a substituent having 1 to 8 carbon atoms, at least one combination of $R_1$ and $R_2$, $R_3$ and $R_4$, $R_5$ and $R_6$, and $R_7$ and $R_8$ together with N forming a substituted or unsubstituted pyrrolidine ring, a substituted or unsubstituted piperidine ring, a substituted or unsubstituted morpholine ring, a substituted or unsubstituted tetrahydropyridine ring or a substituted or unsubstituted cyclohexylamine ring represented by the following formula:

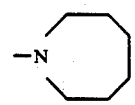

and other substituents are straight or branched alkyl groups.

2. The compound according to claim 1, wherein each combination of $R_1$ and $R_2$, $R_3$ and $R_4$, $R_5$ and $R_6$, and $R_7$ and $R_8$, together with the nitrogen atom to which they are attached, forms a pyrrolidine ring, a 2-methyl pyrrolidine ring, a piperidine ring, a morpholine ring, a tetrahydropyridine ring or a cyclohexylamine ring.

3. The compound according to claim 1, wherein the anion $X^-$ represents bromide, iodide, percholorate, nitrate, benzenesulfonate, p-toluenesulfonate, methylsulfate, ethylsulfate, propylsulfate, tetrafluoroborate, tetraphenylborate, hexafluorophosphate, benzenesulfonate, acetate, trifluoroacetate, propionacetate, benzoate, oxalate, succinate, malonate, oleate, stearate, citrate, monohydrogen diphosphate, dihydrogen monophosphate, pentachlorostannate, chlorosulfonate, fluorosulfonate, trifluoromethansulfonate, hexafluoroarsenate, hexafluoroantimonate, molybdenate, tungustate, titanate or zirconate ions.

* * * * *

UNITED STATES PATENT AND TRADEMARK OFFICE
CERTIFICATE OF CORRECTION

PATENT NO. : 5,245,030
DATED : September 14, 1993
INVENTOR(S) : TETSURO FUKUI, ET AL.

It is certified that error appears in the above-identified patent and that said Letters Patent is hereby corrected as shown below:

COLUMN 1
    line 16, "in" should read --in an--.

COLUMN 3
    line 57, "tungustate" should read --tungstate--.
    line 59, "may" should read --may be--.

COLUMN 4
    line 30, "ring," should read --ring--.
    line 43, "yield, also" should read --yield also,--.

COLUMN 5
    line 14, "$ClO_4, (C_3H_7C_3H_7)_3(CH_2CH_2CH_2CH_2)$" should read --$ClO_4, (C_3H_7,C_3H_7)_3(CH_2CH_2CH_2CH_2)$--.

COLUMN 7
    line 14, "acetate.propionate," should read --acetate propionate,--.
    line 54, "polyamides" should read --polyamide--.

COLUMN 8
    line 34, "(p-nitropheyl)-p-phenylenedimine." should read --(p-nitrophenyl)-p-phenylenediamine.--.

UNITED STATES PATENT AND TRADEMARK OFFICE
CERTIFICATE OF CORRECTION

PATENT NO. : 5,245,030

DATED : September 14, 1993

INVENTOR(S) : TETSURO FUKUI, ET AL.

It is certified that error appears in the above-identified patent and that said Letters Patent is hereby corrected as shown below:

<u>COLUMN 9</u>
line 55, "under" should read --at--.
line 64, "pars" should read --parts--.
line 65, "an" should read --and--.
line 66, "the" should read --the reaction, the--.

<u>COLUMN 14</u>
line 43, "anion X⁻" should read --anion X$^\ominus$-- and "percholorate," should read --perchlorate,--.
line 53, "tungustate" should read --tungstate--.

Signed and Sealed this

Ninth Day of August, 1994

Attest:

BRUCE LEHMAN

Attesting Officer      Commissioner of Patents and Trademarks